United States Patent
Jones

(10) Patent No.: US 12,360,013 B2
(45) Date of Patent: Jul. 15, 2025

(54) DEFECT DETECTION

(71) Applicant: HITACHI RAIL LIMITED, London (GB)

(72) Inventor: Matt Jones, Southampton (GB)

(73) Assignee: HITACHI RAIL LIMITED, London (GB)

( * ) Notice: Subject to any disclaimer, the term of this patent is extended or adjusted under 35 U.S.C. 154(b) by 245 days.

(21) Appl. No.: 18/009,264

(22) PCT Filed: May 27, 2021

(86) PCT No.: PCT/EP2021/064182
§ 371 (c)(1),
(2) Date: Dec. 8, 2022

(87) PCT Pub. No.: WO2021/249782
PCT Pub. Date: Dec. 16, 2021

(65) Prior Publication Data
US 2023/0258537 A1     Aug. 17, 2023

(30) Foreign Application Priority Data

Jun. 8, 2020  (GB) ...................................... 2008614

(51) Int. Cl.
*G01M 7/00*    (2006.01)
*G01M 17/10*   (2006.01)

(52) U.S. Cl.
CPC .............. *G01M 17/10* (2013.01); *G01M 7/00* (2013.01)

(58) Field of Classification Search
CPC ................................ G01M 17/10; G01M 7/00
(Continued)

(56) References Cited

U.S. PATENT DOCUMENTS

| 6,549,869 | B1 | 4/2003 | Piety et al. |
| 2008/0033695 | A1* | 2/2008 | Sahara ................... G01H 1/003 |
| | | | 702/185 |
| 2019/0339163 | A1 | 11/2019 | Husar |

FOREIGN PATENT DOCUMENTS

| CA | 2644184 | A1 * | 9/2007 | .......... B61L 15/0027 |
| CA | 2744287 | A1 * | 5/2010 | ............ B60T 17/228 |

(Continued)

OTHER PUBLICATIONS

Machine translation of JP 2004094393 A (Year: 2004).*
(Continued)

*Primary Examiner* — Jamel E Williams
(74) *Attorney, Agent, or Firm* — J. Miguel Hernandez; James R. Gourley; Carstens, Allen & Gourley, LLP

(57) ABSTRACT

A method of detecting defects in a mechanical system, the method includes the steps of:
  a. providing a mechanical system;
  b. subjecting the mechanical system to random, optionally broadband, vibration by a vibration device to cause the mechanical system to vibrate and output an output vibration spectrum;
  c. detecting the output vibration spectrum using a vibration detection device;
  d. using a processing system to carry out the substeps of:
    i. selecting a plurality of frequencies within the output vibration spectrum;
    ii. analysing the plurality of frequencies to extract phase information for the plurality of frequencies;
    iii. generating a continuous phase waveform representing modulation in phase over time for one or more frequencies of the plurality of frequencies; and
    iv. detecting peaks in the spectrum of the continuous phase waveform at multiples of the input vibration
(Continued)

frequency to produce output data representing defects in the mechanical system.

31 Claims, 6 Drawing Sheets

(58) Field of Classification Search
USPC .......................................... 73/579, 659, 660
See application file for complete search history.

(56) References Cited

FOREIGN PATENT DOCUMENTS

| EP | 2314995 A2 | | 4/2011 |
|----|------------|---|--------|
| JP | 2004094393 A | * | 3/2004 |
| WO | 2019081770 A1 | | 5/2019 |

OTHER PUBLICATIONS

Combined Search and Examination Report for Application No. GB2008614.6 dated Nov. 8, 2021 (10 pages).
International Search Report and Written Opinion of the International Searching Authority for Application No. PCT/EP2021/064182 dated Sep. 2, 2021 (12 pages).

* cited by examiner

DEFECT DETECTION

CROSS REFERENCE TO RELATED APPLICATION

This application is a US 371 application from PCT/EP2021/064182 entitled "Defect Detection" filed on May 27, 2021 and published as WO 2021/249782 A1 on Dec. 16, 2021, which claims priority to GB Application 2008614.6 filed on Jun. 8, 2020. The technical disclosures of every application and publication listed in this paragraph are hereby incorporated herein by reference.

The present invention provides a method of detecting defects in a mechanical system. The present invention further provides an apparatus for detecting defects in a mechanical system. The present invention in particular relates to an apparatus and method for detecting cracks in an axle, for example an axle of a wheelset assembly of a railway vehicle.

Rail axle fractures are one of the causes of major rail accidents throughout the history of rail, and started the study of metal fatigue. Preventing rail axle fractures in service causes significant additional maintenance work—both to carry out axle inspections and to repair damage after incorrect re-assembly of axle end apparatus after axle crack inspections.

There has been significant work to study the formation of axle cracks, in-service or with minimum intervention during maintenance, but there have been no successful trials of large deployment of axle crack monitoring equipment (in-service). This is partly due to the target crack-dependent measurands being intrinsically difficult to carry out in the context of all the other noise present in in-service trains, and also to the difficulty of monitoring rail axle end vibration and noise due to poor accessibility for energy and communication.

Recent development of vibration energy harvester powered wireless sensor nodes that are mounted on the axle end has solved part of this problem, but there is still the difficulty of differentiating additional vibration due to a fracture in the axle, from noise produced by the interaction of the wheel on the track, both of which have the same fundamental frequency driven from the rotation of the wheels at a given speed.

In the prior art, previous efforts to measure rail axle cracking have looked at either acoustic emissions from the fracture as the axle flexes, or the vibration caused by the axle flexing, and the change on the vibration as the crack extends. These tests have been on test rigs, not in an in-service test.

Vibration powered wireless sensor nodes (WSNs) have been used to detect bearing, track and wheel health on rail vehicles. The sensors monitor vibration, as discussed above, but the monitoring frequency is limited to 500 Hz.

The Applicant's earlier WO2019/081770A1 discloses an apparatus for monitoring an axle of a wheelset assembly of a railway vehicle. The apparatus comprises a wireless sensor node fitted to a wheelset assembly. The wireless sensor node comprises an accelerometer mounted to an end of the axle and the sensor and a processor are arranged respectively to measure and process an axle percussion vibration frequency in the form of resonant vibration of the axle within a frequency range of from 1000 to 2000 Hz. WO2019/081770A1 discloses that wheel-rail impact, during an in-service period of the wheelset and measured in real-time, can be used to excite vibration of the wheelset, and in turn that vibration can be used to detect the state or condition of the axle, in particular the presence/absence of cracks in the axle and/or the axle loading.

It is known that asymmetric defects, such as cracks, in rail axles cause modulation of the natural resonant frequency spectrum of the wheelset at the rate of rotation of the axle. This is due to the defect opening and closing as the material around the defect is successively stretched and compressed by the curvature of the axle. Detecting amplitude modulation of movement of the axle end by monitoring acceleration is one possible method for detecting axle defects of this type; however, additional noise from wheel defects can significantly impact on the viability of this measurement. Measuring the state of the axle in the frequency domain moves the measurement away from noise caused by wheels, by looking at fundamental properties of the wheelset resonances. As the axle rotates and a defect is opened and closed, the resonances reflect the different mechanical properties of the axle, effectively producing a modulation of the resonant frequencies. This modulation is dependent on the size of the defect, and independent of the load on the axle, the load potentially including transient loads caused by wheel defects. Although a theoretical study of wheelset resonance indicates that a similar approach to traditional frequency demodulation could be used to extract this signal, the complexity of the wheelset shape, close coupling with other components and significant damping of the vibration means that the resonant frequencies, functioning as carriers, are too broad and coupled, and the signal, functioning as modulation, is too small and close in frequency to the carrier for these methods to work.

There is therefore a need in the art for an apparatus for, and a method of, detecting defects in a mechanical system, for example for detecting cracks in an axle, typically an axle of a wheelset assembly of a railway vehicle, which can provide an improved measurement as compared to known apparatus and methods.

There is also a need in the art for an apparatus for, and a method of, detecting defects in a mechanical system, for example for detecting cracks in an axle, typically an axle of a wheelset assembly of a railway vehicle, which can monitor the condition of the mechanical system in-service, preferably in real-time.

The present invention at least partially aims to meet one or more of these needs.

Accordingly, the present invention provides a method of detecting defects in a mechanical system, the method comprising the steps of:
a. providing a mechanical system;
b. subjecting the mechanical system to random, optionally broadband, vibration by a vibration device to cause the mechanical system to vibrate and output an output vibration spectrum;
c. detecting the output vibration spectrum using a vibration detection device;
d. using a processing system to carry out the substeps of:
  i. selecting a plurality of frequencies within the output vibration spectrum;
  ii. analysing the plurality of frequencies to extract phase information for the plurality of frequencies;
  iii. generating a continuous phase waveform representing modulation in phase over time for one or more frequencies of the plurality of frequencies; and
  iv. detecting peaks in the spectrum of the continuous phase waveform at multiples of the input vibration frequency to produce output data representing defects in the mechanical system.

The present invention further provides an apparatus for detecting defects in a mechanical system, the apparatus comprising a vibration detection device for detecting an output vibration spectrum of the mechanical system which has, in use, been subjected to random, optionally broadband, vibration to cause the mechanical system to vibrate and output the output vibration spectrum; and a processing system comprising a frequency selection module for selecting a plurality of frequencies within the output vibration spectrum; an analysis module for analysing the plurality of frequencies to extract phase information for the plurality of frequencies; a generating module for generating a continuous phase waveform representing modulation in phase over time for one or more frequencies of the plurality of frequencies; and a detection module for detecting peaks in the spectrum of the continuous phase waveform at multiples of the input vibration frequency to produce output data representing defects in the mechanical system.

Preferred features of the apparatus and method of the present invention are defined in the respective dependent claims.

The apparatus and method of the preferred embodiments of the present invention solve the problem of providing an in-service rail axle measurement, optionally in real-time, which can be utilized in a protocol for crack detection, and optionally also for axle load measurement. As the railway vehicle travels along the track, there are multiple impacts from wheel-rail interaction. The axle assembly vibrates in response to the impacts. The vibration-energy powered wireless sensor detects ringing of the wheelset stimulated by the wheel-rail interaction, analyses the vibration, and then transmits key parameters for further analysis.

When an axle has a crack, the resonant frequencies of the axle are affected. This is particularly the case when the axle is placed under load, where for certain angles the crack is forced open and for other angles the crack is forced closed. For railway axles, if the axle resonances are excited via the wheel-rail interface, for example through normal running of the train, and the vibrations of such a cracked axle are measured, the result will be the presence of frequency modulation in the vibration data at a rate equal to, or a multiple of, the axle rotation rate. Since the resonant frequencies of an axle are likely well damped, and cross-coupled, in reality due to the numerous components attached to it, the resonant frequencies are less pronounced as may be seen when the axle is suspended freely. This means that frequency modulation operates over a wide band of frequencies—potentially even all frequencies—which means that standard frequency demodulation techniques as employed in e.g. radio technology cannot be used. The concept of carrier frequencies do not apply, since many overlapping frequencies are likely operating as carriers which prevents typical demodulation approaches.

Instead, the apparatus and method of the preferred embodiments of the present invention are predicated on a novel signal processing approach which is sensitive to this wider bandwidth frequency demodulation scenario, and which uses the known properties of an input vibration frequency, which for an axle is dependent upon the axle rotation rate but for other mechanical systems can be otherwise applied, as the candidate modulation frequency.

The apparatus and method of the preferred embodiments of the present invention are predicated on the extraction of condition information of a complex mechanical system, such as an axle, whereby asymmetric defects, such as cracks, cause modulation of resonant vibration. In the preferred embodiments of the present invention, the spectrum of a time varying vibration signal is computed at a number of discrete frequencies by first splitting the signal into multiple overlapping segments, spaced regularly apart in time. These segments are then windowed with a suitable windowing function and the Fourier Transform is applied to each, to obtain a series of vibration spectra describing the change in vibration over time. The duration of segment used should not exceed half a cycle of the predicted modulation frequency associated with the defect. From the results of each Fourier Transform, the amplitude is discarded, and the phase is extracted and unwrapped, since the original information is limited to +/−π (pi) and a continuous waveform is formed by allowing the signal to continue beyond these limits. The unwrapped phase information from all segments are then combined to form a series of continuous waveforms of time varying phase, one for each frequency selected from the original Fourier Transform, at a sample rate dictated by the spacing of the overlapping windowed segments of the original vibration signal. Each continuous waveform of time varying phase represents the modulation present at a given frequency, or carrier in the original resonance spectrum. This modulation waveform is then subjected to a further Fourier Transform, potentially calculated for only a subset of frequencies, in order to extract the spectrum of modulation of the carrier, representing changes in the structural resonance induced by the asymmetric defect. The resultant signal is independent of the load on the axle, depending only on the size and location of the defect. Defects in the mechanical system, such as an axle, cause peaks of modulation to appear in the phase spectrum at multiples of the frequency of the input vibration, such as an axle rotation frequency. In the preferred embodiments of the present invention, this signal processing can be used to test an axle in-service, and a real-time measurement and analysis can be used to monitor axle condition. It will be clear to those skilled in the art that the same apparatus (with modified signal processing) can-optionally also be used to measure axle loads.

Embodiments of the present invention will now be described, by way of example only, with reference to the accompanying drawings, in which.

Figure 4:
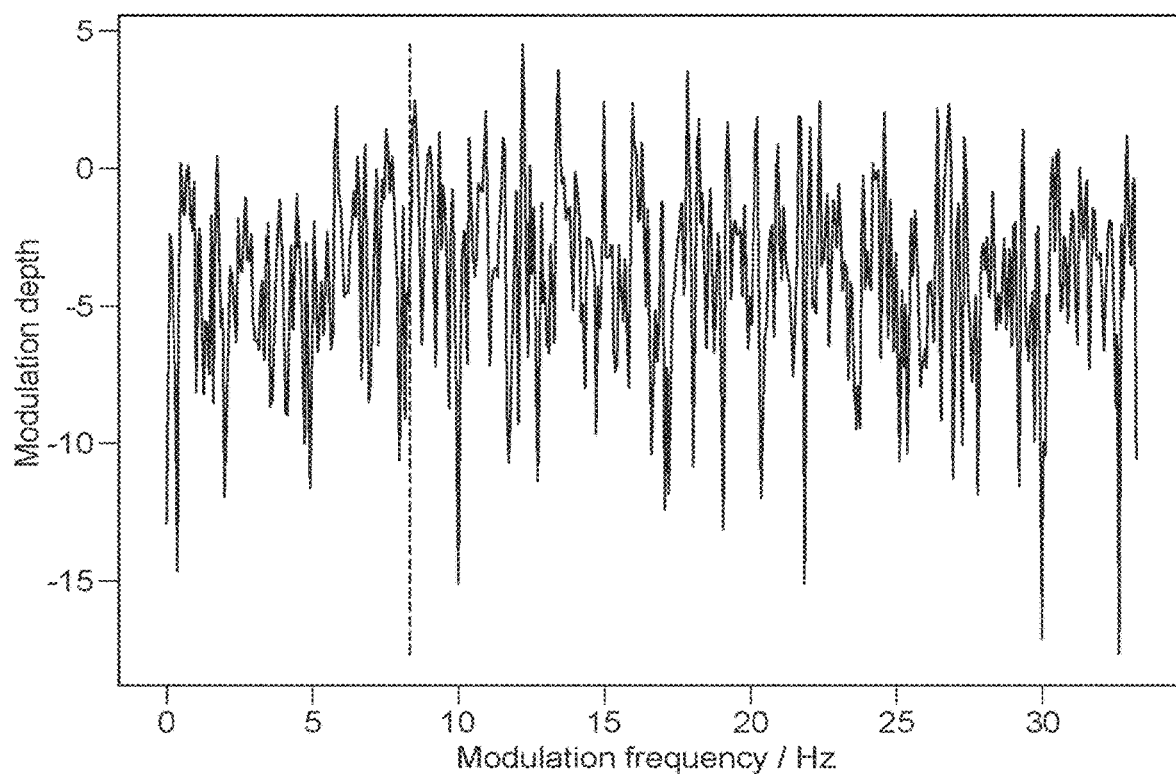
Figure 5:
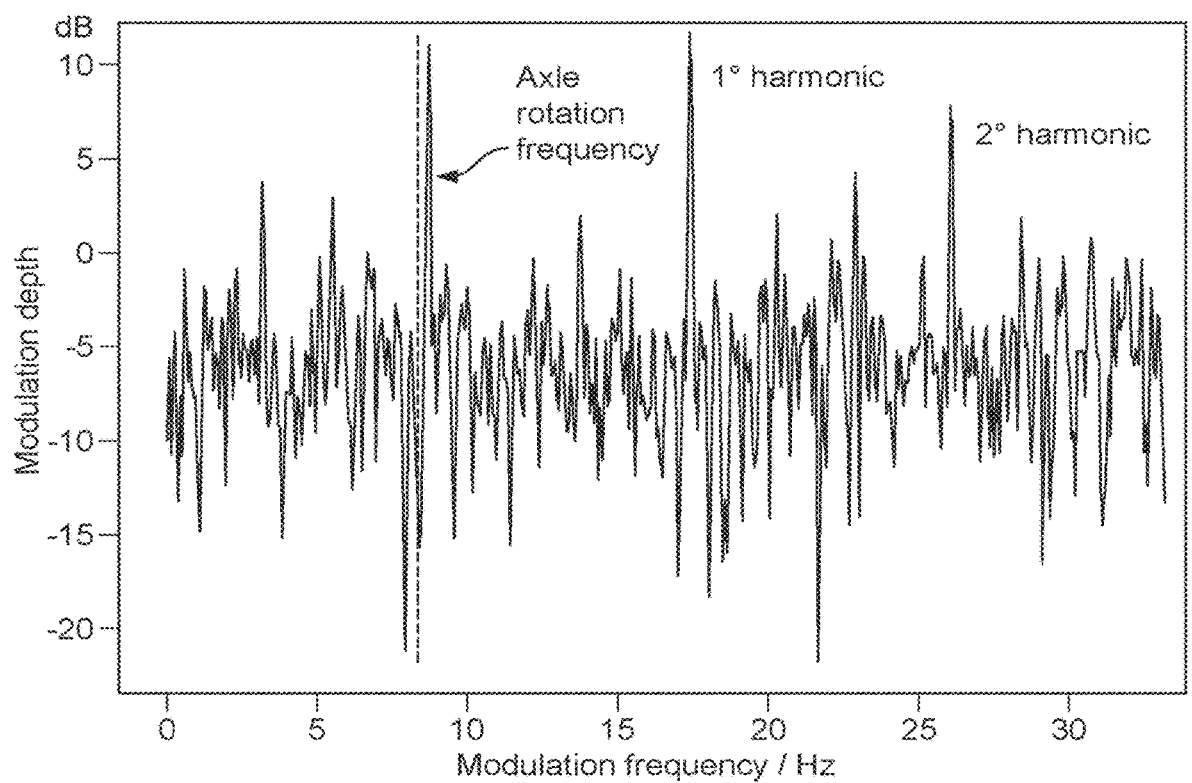
Figure 6:
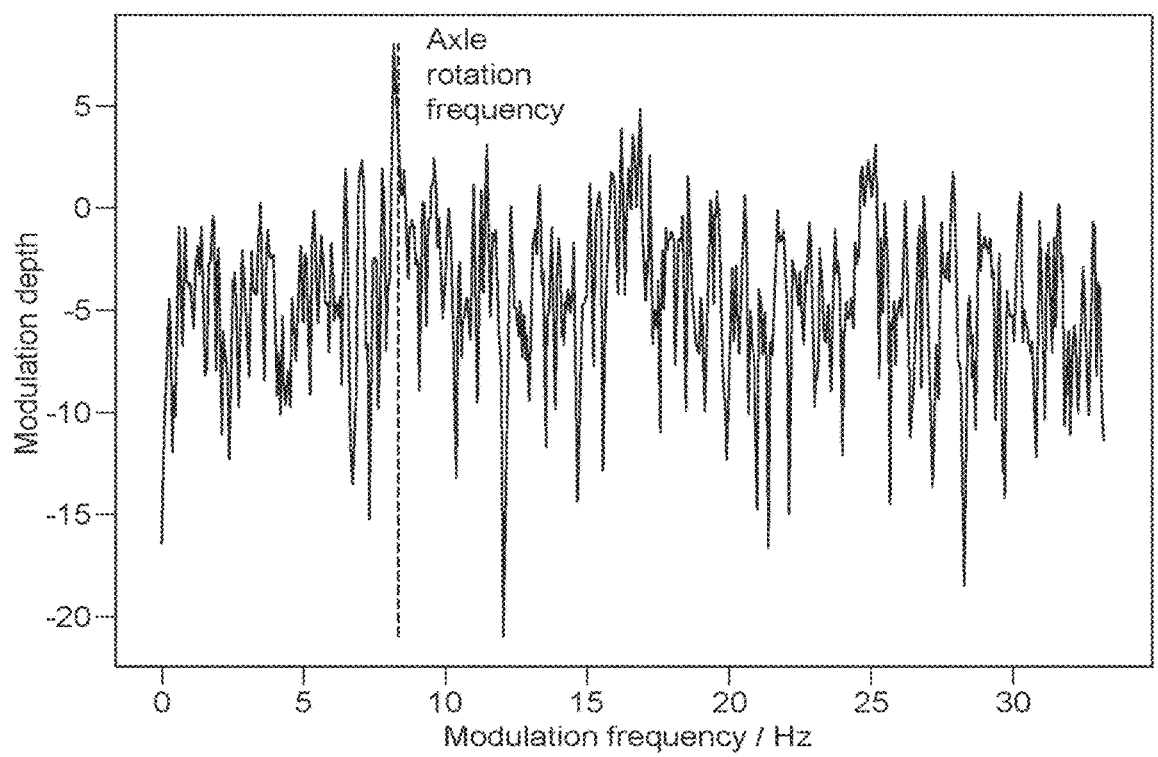
Figure 7:
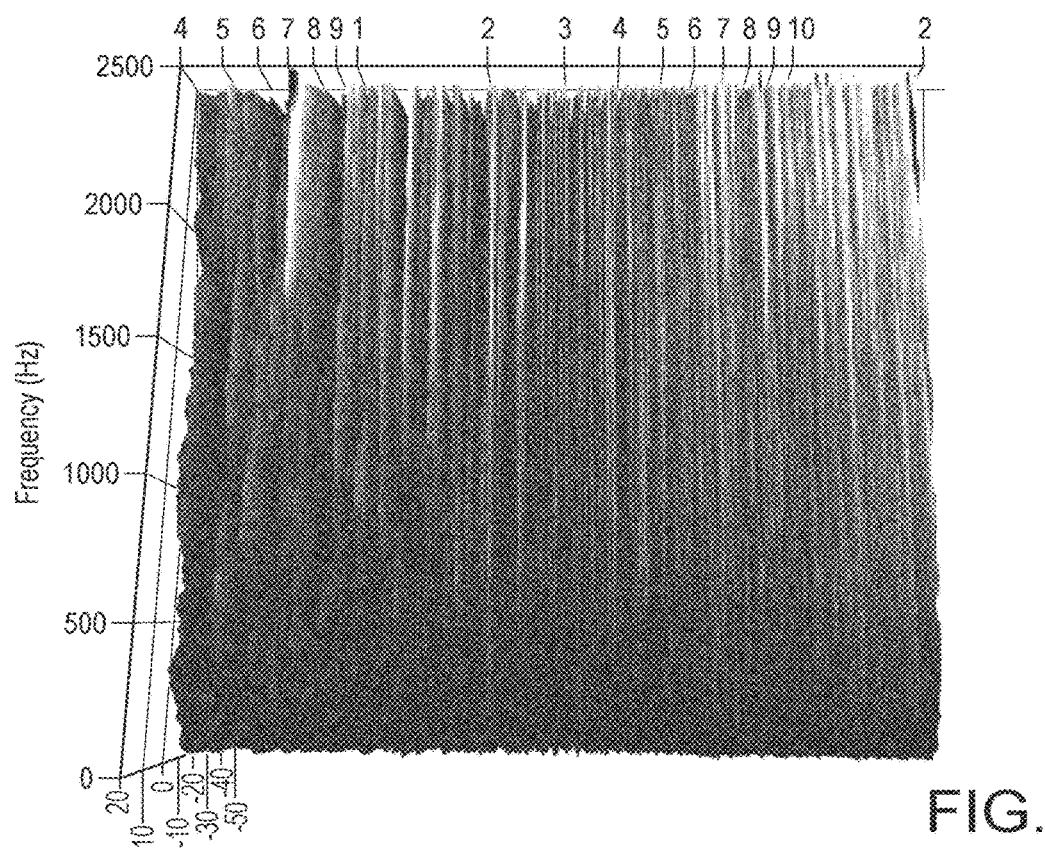
Figure 8:
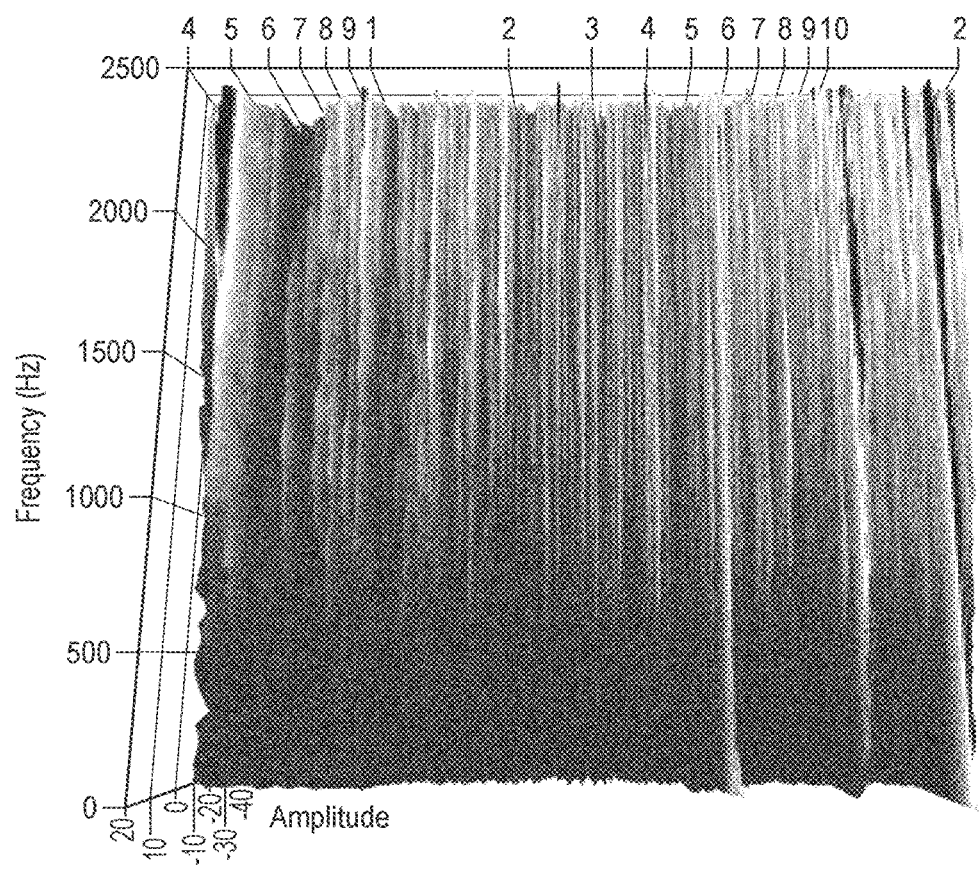

FIGS. 4, 5 and 6 show the relationship, illustrated as a two-dimensional modulation spectrum, between the modulation depth (Y-axis) and the modulation frequency (X-axis) of, respectively, an uncracked axle, a heavily cracked axle and an axle with a small crack, measured in accordance with the preferred embodiment of the present invention; and FIGS. 7 and 8 show the relationship, illustrated as a three-dimensional modulation spectrum, between the modulation depth (Z-axis), the frequency being modulated (Y-axis) and the modulation frequency (X-axis) of, respectively, an uncracked axle and a cracked axle, measured in accordance with the preferred embodiment of the present invention.

Figure 1:
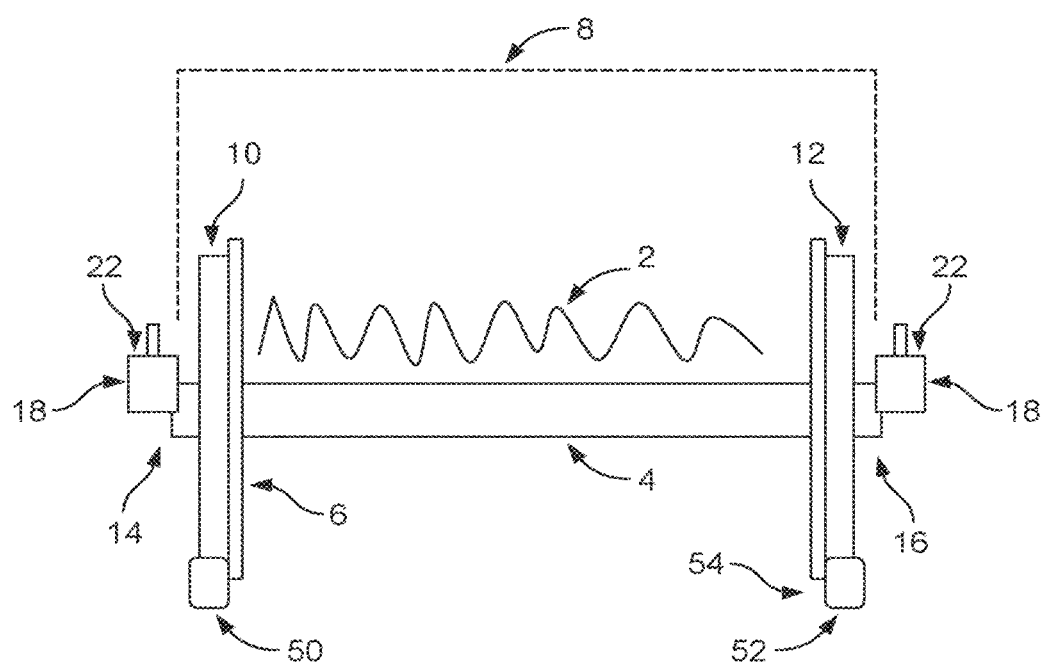
FIG. 1 is a schematic end view of an apparatus for detecting a crack in an axle of a wheelset assembly of a railway vehicle according to an embodiment of the present invention.
Figure 2:
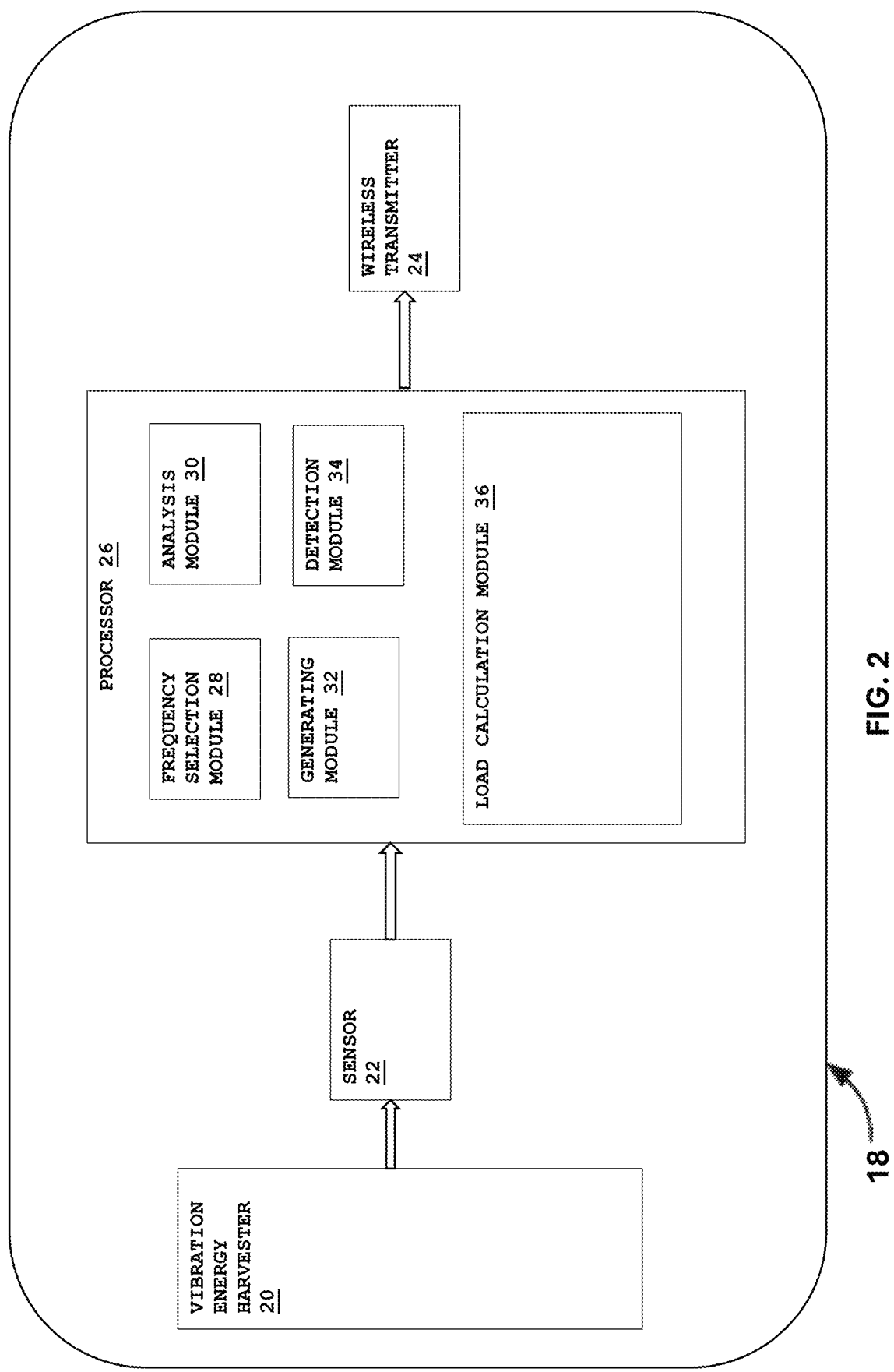
FIG. 2 is a schematic view of the processing system in the apparatus of FIG. 1.

Referring to FIGS. 1 and 2, there is shown an apparatus 2 for detecting cracks in a component 4 of a wheelset assembly 6 of a railway vehicle 8. The railway vehicle 8 may be a locomotive, a passenger carriage or a freight car or truck. The wheelset assembly 6 comprises an axle 4, which is the component to be monitored, mounted between opposed wheels 10, 12, each wheel 10, 12 being fitted to a respective opposite end 14, 16 of the axle 4. In use, the wheels 10, 12 run on respective rails 50, 52 of a railway track 54.

Although the embodiment of the present invention is described with reference to an axle, the present invention may be used to detect defects such as cracks in any mechanical device using the principle of the method of the present invention.

A wireless sensor node 18 is fitted to the wheelset assembly 6. In the illustrated embodiment, the wireless sensor node 18 comprises a vibration energy harvester 20 for converting mechanical energy from vibration in the wheelset assembly 6 into electrical energy. A sensor 22 is provided for measuring a parameter, and in particular the sensor 22 is an accelerometer mounted to an end 14, 16 of the axle 4. A wireless transmitter 24 is provided for wirelessly transmitting the measured parameter or data associated therewith to a remote location for further processing and/or analysis; the remote location may be within the railway vehicle 8 which includes the tested wheelset assembly 6, or within a locomotive or other vehicle of a train which includes the wheelset assembly 6. Typically, each wheelset assembly 6 within a train is provided with a monitoring apparatus as described herein.

Preferably, as illustrated, the apparatus 2 comprises two of the wireless sensor nodes 18. Each wireless sensor node 18 is fitted to a respective opposite end 14, 16 of the axle 4, and each wireless sensor node 18 comprises a respective sensor 22 which is an accelerometer mounted to a respective end 14, 16 of the axle 4. The sensor 22 is a vibration detection device.

The apparatus 2 further comprises a processor 26 for processing the measured parameter to produce processed data. In the illustrated embodiment, the processor 26 is integral with the wireless sensor node 18, and the wireless transmitter 24 is arranged wirelessly to transmit the processed data. However, in alternative embodiments, the processor 26 is remote from the wireless sensor node 18, and the wireless transmitter 24 is arranged wirelessly to transmit the measured data which is then remotely processed by the processer 26 to produce the processed data.

The sensor 22 and processor 26 are arranged respectively to measure and process an axle vibration, in particular the axle vibration in the form of resonant vibration along the axle. The axle vibration is typically percussion driven vibration. The resonant vibration of the axle is typically within a frequency range of from 50 to 2000 Hz, more typically from 50 to 1750 Hz.

The sensor 22 measures the percussion vibration (at a sample rate S), and from that measurement a waveform is determined as described below. The determined waveform is dependent upon the axle condition and the axle load.

Accordingly, the apparatus of the illustrated embodiment comprises a vibration detection device, in the form of sensor 22, for detecting an output vibration spectrum of the mechanical system, in the illustrate embodiment axle 4, which has, in use, been subjected to random, optionally broadband, vibration by a vibration device, for example the interface between the wheelset and the track, to cause the mechanical system to vibrate and output the output vibration spectrum. The vibration detection device is configured to measure the output vibration spectrum, expressed as the relationship between vibration amplitude and time, over a continuous measurement time period (T), for example at least 10 seconds.

The processor 26 comprises a processing system which itself is comprised of a plurality of functional modules that may be programmed in hardware and/or in software. The processor 26 comprises a frequency selection module 28 for selecting a plurality of frequencies within the output vibration spectrum. The frequency selection module 28 is configured to select a plurality of groups of vibration measurements, each group having a common time period, wherein successive groups partly overlap in time and are shifted in time by a time shift ($dt_2$). Each group may then have a common windowing function applied. Using the Fourier Transform computed for a number of discrete frequencies, the vibration detection device is configured to compute the output vibration spectrum at a sample rate (S) for each group. The successive groups selected by the frequency selection module 28 partly overlap to provide a series of overlapped output frequency spectra.

The processor 26 further comprises an analysis module 30 for analysing the plurality of frequencies to extract phase information for the plurality of frequencies. The analysis module is also configured to unwrap the extracted phase information to result in the continuous unbound phase as a function of frequency. The processor 26 further comprises a generating module 32 for generating a continuous phase waveform representing changes in the extracted phase over time for a given frequency of the plurality of frequencies, at a sample rate (Fs2) of 1/dt2. In the illustrated embodiment, the generating module 32 is configured to combine the continuous phase waveforms at different frequencies to form a matrix of dimensions M*(N/2) where M is the number of windowed time segments T/dt2 and N is the number of frequencies selected in the original output spectrum. The generating module 32 is furthermore configured to subject at least one of the (N/2) columns to a second Fourier Transform analysis to determine a phase modulation spectrum at the respective frequency from a magnitude of the phase values, wherein the phase modulation spectrum comprises the continuous phase waveform generated by the generating module 32.

The processor 26 further comprises a detection module 34 for detecting peaks in the continuous phase waveform at multiples of the input vibration frequency to produce output data representing defects in the mechanical system.

Typically, the wireless sensor node 18 may be adapted to be operated continuously over a monitoring period thereby continuously to measure the axle vibration and continuously to produce output data representing defects in the mechanical system, in particular cracks in the axle. The output data can be employed to provide an indication of axle condition in real-time and during service of the wheelset assembly 6.

In the preferred embodiments, the processor 26 further includes a load calculator module 36 which comprises a comparison module 38 arranged to compare a frequency of the axle percussion induced resonant vibration against a predetermined reference frequency value associated with an axle load and a calculation module 40 arranged to calculate a load on the axle based on the comparison.

These components permit an axle percussion induced resonant vibration frequency value to be continuously measured and compared against a calibrated reference value to provide an indication of axle load in real-time and during service of the wheelset assembly 6.

The apparatus 2 is used in a method of detecting defects in a mechanical system, in particular the axle 4, of the wheelset assembly 6, and the method may be for monitoring the mechanical system either periodically or continuously.

In the method, a wireless sensor node 18 as described above is fitted to the wheelset assembly 6, so that the sensor 22, in particular the accelerometer, is mounted to an end 14, 16 of the axle 4. As described above, in the preferred embodiment there are two wireless sensor nodes 18 each fitted to the wheelset assembly 6, so that each respective sensor 22 is mounted to a respective end 14, 16 of the axle 4.

While the railway vehicle is in motion, the vibration energy harvester 20 receives input vibration energy which is converted into electrical energy to power the wireless transmitter 24. When the processor 26 is integrated into the wireless sensor node 18 the vibration energy harvester 20 can provide the electrical energy to operate the processor 26. The vibration energy harvester 20 can provide the electrical energy to operate any other powered components of the wireless sensor node 18.

Also while the railway vehicle is in motion, during an in-service period, the axle vibration is measured using the sensor 22 and the measured axle vibration or data associated therewith is wirelessly transmitted using the wireless transmitter 24.

In the method of detecting defects in a mechanical system according to the present invention, a mechanical system is provided, such as the axle 4, and the mechanical system is subjected to random, optionally broadband, vibration by a vibration device such as by the wheel/track interface acting on the rotating axle 4, to cause the mechanical system to vibrate and output an output vibration spectrum. The input vibration frequency may be a rotation frequency of the axle 4.

The output vibration spectrum is detected by using the sensor 22 functioning as the vibration detection device. The output vibration spectrum is measured over a continuous measurement time period (T) and is expressed as the relationship between vibration amplitude and time. The continuous measurement time period (T) is at least 8.5 seconds. The output vibration spectrum is detected at a sample rate (S)

The processor is then used to carry out a series of substeps, as described below.

Figure 3:
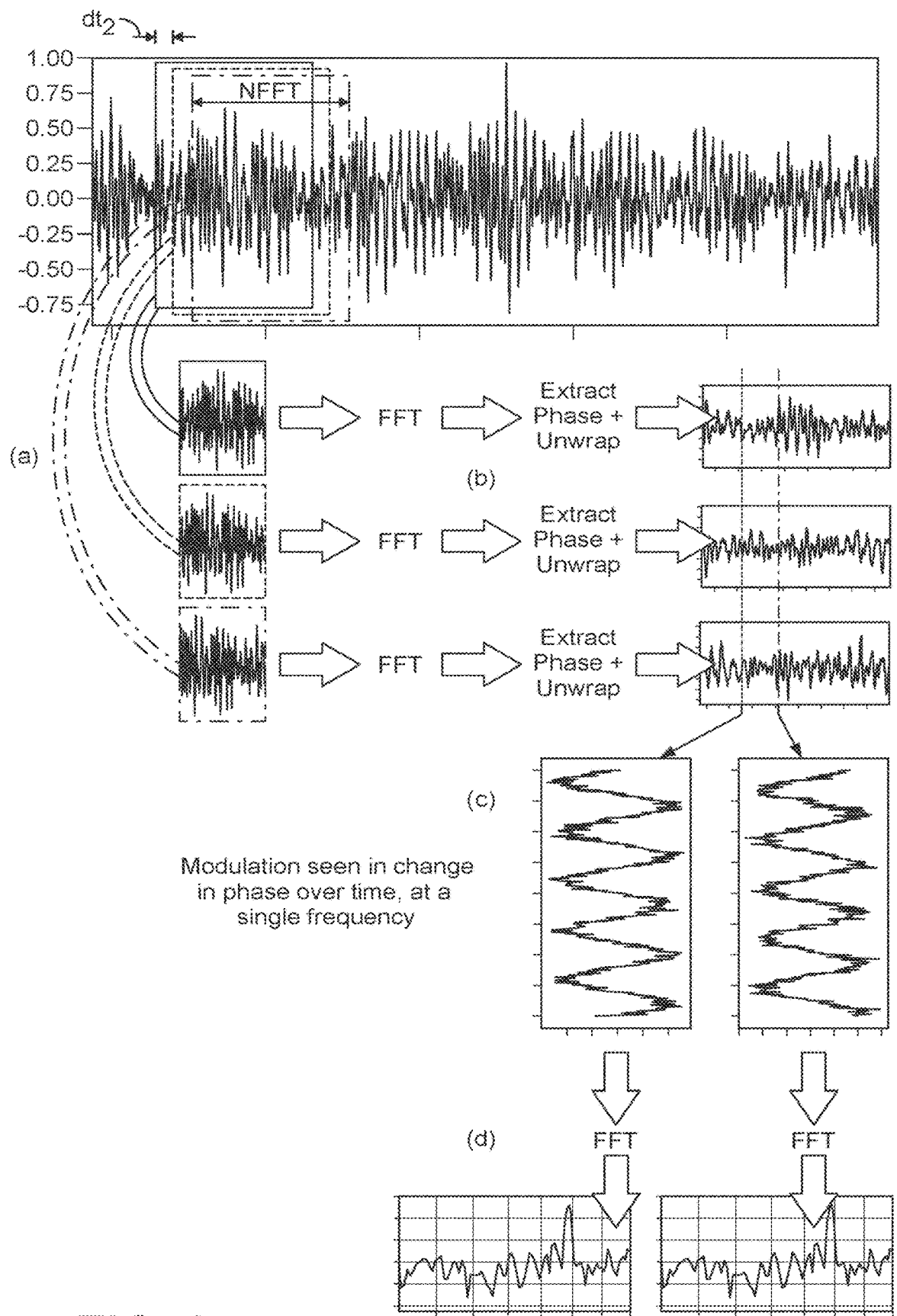
FIG. 3 is a schematic process flowchart showing the steps taken in the method of detecting a defect in a mechanical system, for example using the apparatus illustrate in FIGS. 1 and 2.

Referring in particular to FIG. 3, as described above, initially, it is assumed that a single-axis continuous measurement of acceleration is obtained for at least 8.5 seconds duration, using a sample rate (Fs) of at least 10 times that of the predicted modulation frequency. This is used as the input to the algorithm implemented by the substeps of the method of the invention.

In a first substep (a), the frequency selection module 28 selects a plurality of frequencies within the output vibration spectrum. In substep (a) a plurality of groups of vibration measurements are selected, each group having a common time period, wherein successive groups partly overlap in time and are shifted in time by a time shift ($dt_2$). The successive groups partly overlap to provide a series of overlapped output frequency spectra.

Referring in particular to FIG. 3, in substep (a) the acceleration signal is split into a series of M overlapping groups of vibration samples, of length N and spaced apart by time $dt_2$ seconds. This means each group has an overlap of N (Fs $dt_2$) samples. The time $dt_2$ determines the bandwidth of the output phase modulation spectrum.

In a second substep (b), the analysis module 30 analyses the plurality of frequencies to extract phase information for the plurality of frequencies. In substep (b) each group of vibration measurements is subjected to a Fourier Transform analysis to generate from each group of vibration measurements a respective vibration spectrum. In substep (b) phase information from each frequency of the respective vibration spectrums is extracted.

Referring to FIG. 3, in substep (b) the Fourier Transform is computed for each group individually to generate a vibration spectrum for each. Then, only the phase information from this is kept, and the magnitude information is discarded and not subsequently utilised.

The extracted phase information is wrapped within the range of $-\pi$ to $+\pi$. In substep (b) the extracted phase information is unwrapped to provide a respective continuous phase waveform as a function of frequency, which is no longer wrapped around the range of $-\pi$ to $+\pi$. In the preferred embodiment, only the first half of the phase information is kept (N/2 values), since the second half contains the negative frequency portion only.

In a third substep (c), the generating module 32 generates a continuous phase waveform representing modulation in phase over time for a given frequency of the plurality of frequencies. Preferably, the sample rate (S) is at least 10 times greater than the given frequency in substep (c). Preferably, the sample duration in the first Fourier Transform analysis is shorter than the given periodic phase modulation in substep (c). Preferably, the windowed segments are spaced apart such that the ratio ($1/dt_2$) is at least a factor of 10 times less than the predicted modulation frequency.

Referring to FIG. 3, the arrays of unwrapped phase are then stacked on top of each other, which are illustrated as rows in FIG. 3, to form a matrix M*(N/2) in size, and the columns of this array are extracted which then represent the change in phase at a single frequency, over time. The new sample rate ($Fs_2$) of this phase time series is $1/dt_2$. At this stage, the periodicity of any phase modulation may be discernible. The columns of the matrix represent the phase modulation time series at a single frequency.

For one or more of these frequencies, the time series is first detrended (e.g. the mean or slope is subtracted), and then the Fourier Transform is computed. Only the magnitude of this is then used, and only for the first half of the values, since the second half contain the negative frequency components. From this magnitude of the spectrum, strong modulation will be detectable from the presence of a narrow peak at the appropriate modulation frequency.

In a fourth substep (d), the detecting module 34 detects peaks in the continuous phase waveform at multiples of the input vibration frequency to produce output data representing defects in the mechanical system.

The final output of the continuous phase waveform, herein also referred to as the 'modulation spectrum' here, can be interpreted as highlighting the strength of any broadband frequency modulation present. By looking for the clear presence of a narrow peak in the modulation spectrum (as compared to neighbouring frequency bins) the presence of a potential crack in the axle can be deduced.

By computing the modulation spectra produced in substep (d) for a number of different frequencies, the strength of modulation present at each of these frequencies can be determined. This can be valuable in optimising the signal-to-noise ratio, since the modulation may be easier to discern in certain frequency regions compared to others.

FIGS. 4, 5 and 6 show the relationship, illustrated as a two-dimensional modulation spectrum, between the modulation depth (Y-axis) and the modulation frequency (X-axis) for an axle measured under a 4 kN load. The dashed vertical line indicated the axle rotation frequency. FIGS. 4, 5 and 6 show the output for an uncracked axle, a heavily cracked axle and a lightly cracked axle respectively. The heavily cracked axle shows additional harmonics of the axle rotation frequency.

The modulation spectra for all frequencies can also be displayed in the form of a 3D surface, as shown in FIGS. 7 and 8. In FIGS. 7 and 8, ere, the horizontal axis is the modulation frequency, the vertical axis (bottom to top) is the frequency being modulated, and the height (out of the page, corresponding to the grey scale) represents the depth of modulation present. A horizontal slice through this surface produces the modulation spectrum, as shown in FIGS. 4 to 6. FIGS. 7 and 8 show that the peaks in modulation due to the axle crack are more clearly distinguishable at lower frequencies (below 700 Hz)—above this frequency the noise floor increases, whilst the peak amplitude at the modulation frequencies stays relatively constant.

Various modifications to the preferred embodiments of the present invention will be apparent to those skilled in the art.

The invention claimed is:

1. A method of detecting defects in a mechanical system, the method comprising the steps of:
  a. providing a mechanical system;
  b. subjecting the mechanical system to random vibration by a vibration device to cause the mechanical system to vibrate and output an output vibration;
  c. detecting the output vibration using a vibration detection device;
  d. using a processing system to carry out the substeps of:
    i. selecting a plurality of frequencies within the output vibration wherein a plurality of groups of vibration measurements are selected, each group having a common time period, wherein successive groups partly overlap in time and are shifted in time by a time shift ($dt_2$);
    ii. analysing the plurality of frequencies to extract phase information for the plurality of frequencies;
    iii. generating a continuous phase waveform representing modulation in phase over time for one or more frequencies of the plurality of frequencies; and
    iv. detecting peaks in the continuous phase waveform at multiples of an input vibration frequency to produce output data representing defects in the mechanical system.

2. The method according to claim 1 wherein the output vibration is measured over a continuous measurement time period (T) and is expressed as the relationship between vibration amplitude and time.

3. The method according to claim 2 wherein the continuous measurement time period (T) is at least 8.5 seconds.

4. The method according to claim 1 wherein in substep (ii) each group of vibration measurements is subjected to a first Fourier Transform analysis to generate from each group of vibration measurements a respective vibration spectrum.

5. The method according to claim 4 wherein the sample duration in the first Fourier Transform analysis is shorter than wavelength of the given periodic phase modulation in substep (iii).

6. The method according to claim 1 wherein in substep (ii) phase information from each frequency of the respective vibrations is extracted.

7. The method according to claim 6 the extracted phase information is wrapped within the range of $-\pi$ to $+\pi$, and in substep (iii) the extracted phase information is unwrapped to provide a respective continuous phase waveform, representing changes in phase over time, for each group of frequencies in the vibration measurements.

8. The method according to claim 7 wherein each continuous phase waveform comprises only the positive or only the negative phase values.

9. The method according to claim 7 wherein in substep (iii) the continuous phase waveforms are combined, and then analysed to provide a change in phase with respect to time at a single frequency.

10. The method according to claim 9 wherein in substep (iii) the combined continuous phase waveforms are analysed at a sample rate ($F_{s2}$) of $1/dt_2$, where the time shift ($dt_2$) determines the bandwidth of an output phase modulation.

11. The method according to claim 9 wherein in substep (iii) the continuous phase waveforms are combined to form a matrix M*(N/2) where M is the number of rows and (N/2) is the number of columns, each column corresponding to a respective phase modulation time series at a respective frequency.

12. The method according to claim 11 wherein in substep (iii) at least one of the columns is subjected to a second Fourier Transform analysis to determine a phase modulation at the respective frequency from a magnitude of the unwrapped phase values, wherein the phase modulation comprises the continuous phase waveform generated in substep (iii).

13. The method according to claim 12 wherein in substep (iii) the phase information in the column that is subjected to the second Fourier Transform analysis comprises only the positive or only the negative frequency values.

14. The method according to claim 1 wherein the mechanical system comprises an axle of a vehicle.

15. The method according to claim 14 wherein the mechanical system comprises a wheelset assembly of a railway vehicle, the wheelset assembly comprising an axle mounted between opposed wheels, each wheel being fitted to a respective opposite end of the axle.

16. The method according to claim 15 wherein the railway vehicle is a locomotive, a passenger carriage or a freight car or truck.

17. The method according to claim 14 wherein steps (b) to (d) are carried out while the vehicle is in motion.

18. The method according to claim 17 wherein steps (b) to (d) are carried out in real-time.

19. The method according to claim 14 wherein the input vibration frequency is a rotation frequency of the axle.

20. The method according to claim 14 wherein steps (c) and (d) are carried out using a wireless sensor node fitted to the mechanical system, the wireless sensor node comprising a vibration energy harvester for converting mechanical energy from vibration in the mechanical system into electrical energy, a sensor for measuring a parameter, wherein the sensor is an accelerometer mounted to an end of the axle, and a wireless transmitter for wirelessly transmitting the measured parameter or data associated therewith.

21. The method according to claim 1 wherein the method detects asymmetric defects in the mechanical system.

22. The method according to claim 21 wherein the asymmetric defects are cracks in the mechanical system.

23. An apparatus for detecting defects in a mechanical system, the apparatus comprising a vibration detection device for detecting an output vibration of the mechanical system which has, in use, been subjected to random vibration to cause the mechanical system to vibrate and output an output vibration; and a processing system comprising a frequency selection module for selecting a plurality of frequencies within the output vibration wherein the frequency selection module is configured to select a plurality of groups of vibration measurements, each group having a common time period, wherein successive groups partly overlap in time and are shifted in time by a time shift ($dt_2$); an analysis module for analysing the plurality of frequencies to extract phase information for the plurality of frequencies; a generating module for generating a continuous phase waveform representing modulation in phase over time for one or more frequencies of the plurality of frequencies; and a detection module for detecting peaks in the continuous phase waveform at multiples of an input vibration frequency to produce output data representing defects in the mechanical system.

24. The apparatus according to claim 23 wherein the vibration detection device is configured to measure the output vibration, expressed as the relationship between vibration amplitude and time, over a continuous measurement time period (T).

25. The apparatus according to claim 23 wherein the analysis module is configured to subject each group of vibration measurements to a first Fourier Transform analysis to generate from each group of vibration measurements a respective vibration spectrum.

26. The apparatus according to claim 25 wherein the analysis module is configured to extract phase information from each frequency of the respective vibrations.

27. The apparatus according to claim 26 wherein the generating module is configured to unwrap the extracted phase information to provide a respective continuous phase waveform, representing changes in phase over time.

28. The apparatus according to claim 27 wherein the generating module is configured to combine the continuous phase waveforms and then analyse the combined continuous phase waveforms to provide a change in phase with respect to time at a single frequency.

29. The apparatus according to claim 28 wherein the generating module is configured to analyse the combined continuous phase waveforms at a sample rate ($F_{s2}$) of $1/dt_2$.

30. The apparatus according to claim 28 wherein the generating module is configured to combine the continuous phase waveforms to form a matrix (T/S)2 where M is the number of rows and $(T/d_{t2})/2$ is the number of columns, each column corresponding to a respective phase modulation time series at a respective frequency.

31. The apparatus according to claim 30 wherein the generating module is configured to subject at least one of the columns to a second Fourier Transform analysis to determine a phase modulation spectrum at the respective frequency from a magnitude of the phase values, wherein the phase modulation spectrum comprises the continuous phase waveform generated by the generating module.

* * * * *